(12) United States Patent
Van De Nieuwelaar et al.

(10) Patent No.: US 8,821,222 B2
(45) Date of Patent: Sep. 2, 2014

(54) SCRAPER HEAD, DEVICE AND METHOD FOR CLEANING THE NECK OF POULTRY CARCASSES

(75) Inventors: Adrianus Josephes Van De Nieuwelaar, Gemert (NL); Johannes Henricus Maria Van Mil, Sint Anthonis (NL); Wilhelmus Martinus Kusters, Liempde (NL); Fransiscus Cornelis Wilhelmus Van Gaal, Sint Anthonis (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 80 days.

(21) Appl. No.: 12/997,475

(22) PCT Filed: Apr. 16, 2009

(86) PCT No.: PCT/NL2009/050204
§ 371 (c)(1),
(2), (4) Date: Feb. 4, 2011

(87) PCT Pub. No.: WO2009/151317
PCT Pub. Date: Dec. 17, 2009

(65) Prior Publication Data
US 2011/0171893 A1   Jul. 14, 2011

(30) Foreign Application Priority Data
Jun. 12, 2008  (NL) .................................... 2001677

(51) Int. Cl.
*A22B 5/16*  (2006.01)
*A22C 21/06*  (2006.01)

(52) U.S. Cl.
CPC ..................... *A22C 21/06* (2013.01)
USPC ............................................ 452/117; 452/94

(58) Field of Classification Search
USPC .................. 452/94–95, 116–120, 123, 173
See application file for complete search history.

(56) References Cited

U.S. PATENT DOCUMENTS

| | | | |
|---|---|---|---|
| 3,175,244 A * | 3/1965 | Sharp et al. | 452/114 |
| 3,714,681 A * | 2/1973 | Van Snellenberg | 452/116 |
| 4,610,050 A * | 9/1986 | Tieleman et al. | 452/117 |
| 4,704,768 A * | 11/1987 | Hutting et al. | 452/106 |
| 4,788,749 A | 12/1988 | Hazenbroek et al. | |
| 4,958,408 A * | 9/1990 | Meyn | 452/117 |
| 5,122,090 A * | 6/1992 | van de Nieuwelaar et al. | 452/116 |
| 5,178,578 A * | 1/1993 | Simmons | 452/117 |
| 5,222,905 A | 6/1993 | Van den Nieuwelaar et al. | |
| 5,597,350 A * | 1/1997 | Hunking et al. | 452/117 |
| 5,688,164 A * | 11/1997 | Mills et al. | 452/122 |
| 6,027,403 A | 2/2000 | Hazenbroek et al. | |
| 6,176,772 B1 * | 1/2001 | Hazenbroek et al. | 452/117 |
| 6,213,864 B1 | 4/2001 | Griffiths et al. | |
| 2005/0186895 A1 * | 8/2005 | Winkelmolen et al. | 452/117 |

FOREIGN PATENT DOCUMENTS

| | | |
|---|---|---|
| EP | 0178825 A1 | 4/1986 |
| EP | 0516888 A1 | 12/1992 |
| EP | 0838156 A2 | 4/1998 |
| FR | 2708417 A1 | 2/1995 |

* cited by examiner

*Primary Examiner* — David Parsley
(74) *Attorney, Agent, or Firm* — The Webb Law Firm, P.C.

(57) ABSTRACT

The invention relates to a scraper head for cleaning the neck of poultry carcasses. The invention also relates to a device for cleaning the neck of poultry carcasses provided with such a scraper head. Finally, the invention also relates to a method for cleaning the neck of poultry carcasses, wherein a scraper head is moved out of the chest cavity into the neck.

19 Claims, 4 Drawing Sheets

SCRAPER HEAD, DEVICE AND METHOD FOR CLEANING THE NECK OF POULTRY CARCASSES

BACKGROUND OF THE INVENTION

1) Field of the Invention

The invention relates to a scraper head for cleaning the neck of poultry carcasses and to a device for cleaning the neck of poultry carcasses, of which such a scraper head forms part. The invention further also relates to a method for cleaning the neck of poultry carcasses.

2) Description of the Related Art

After slaughtering of poultry the intestinal system is usually removed in mechanized slaughtering lines through an incision arranged for this purpose in the carcass. After the removal of the intestinal system there usually remains behind in the neck of the carcass at least parts of the windpipe, gullet and the crop (a pouch in which food is collected and in which it is soaked in saliva). This is undesirable. An operation is therefore also carried out in slaughtering lines in which the neck is cleaned internally such that the windpipe, gullet and crop are then at least substantially removed from the neck. The tools used herein are also referred to as "crop bore" and are known from inter alia EP 0 516 888 and U.S. Pat. No. 4,788,749. A drawback of the existing tools and systems for the mechanized cleaning of the neck of poultry carcasses is that damage is frequently caused to the skin and bones of the neck during the cleaning. Another drawback of the existing tools is that they remove tissue from the neck vertebrae where this is unnecessary or even undesirable.

The present invention has for its object to provide an improved scraper head, an improved device and an improved method for cleaning the neck of poultry carcasses, with which windpipe, gullet and crop are effectively removed and whereby at the same time the chance of damage to skin and bones of the neck is limited.

SUMMARY OF THE INVENTION

The present invention provides for this purpose a scraper head for cleaning the neck of poultry carcasses, comprising: an elongate scraping body with a jacket which encloses the scraping body and which is provided with at least one recess left clear in the jacket, wherein at least part of the edges bounding the recess form scraping edges for detaching from the carcass the tissue parts to be removed from the neck of poultry carcasses; and a coupling segment connecting to the end surface of the elongate scraping body opposite the free end surface, wherein the recess left clear in the jacket is provided with an elongate main recess part to which at least two recess branches connect. Using such a scraper head provided with at least one recess with a complex geometry as described, the tissue parts to be removed can be efficiently detached, wherein unnecessary and undesirable damage to carcass parts not to be removed, such as skin of the neck and support membranes, occurs less than in the prior art. Removing precisely those parts which must be removed (windpipe, gullet and crop), and no more than these parts, has a number of advantages. First of all, by applying the present scraper head the yield of the slaughtering process can be increased and the slaughtering product is not contaminated with (portions of) tissue parts which should preferably have been removed. An additional advantage is that, due to the targeted removal of precisely those specific tissue parts for removal, no unnecessary contamination of the processed carcass occurs (consider for instance released bone particles).

Particularly advantageous test results have been realized with a scraper head which is characterized in that the recess branches connecting to the same main recess part are substantially parallel and connect to the same longitudinal side of the associated elongate main recess part. A recess is thus created which is bounded by so-called "teeth", this having a positive effect on the "scraping" action of the scraper head.

For further good operation it is advantageous if the recess branches taper (become narrower) in the direction away from the elongate main recess part. By rotating the scraper head the tissue parts protruding into a recess part can thus be grasped by the scraper head.

In order to further increase the efficiency of the scraper head without here increasing the chance of undesired damage to the carcass, a transition from the elongate main recess part to a recess branch and facing the coupling segment is desirably provided with a rounded corner with radius between 0 and 3 mm.

If at least three recess branches connect to a main recess part and the distance between the adjacent recess branches is herein constant, the scraper head will be able to perform a uniform scraping action. With the same purpose it is advantageous if the main recess parts of the individual recesses are parallel.

For a further increase in the efficiency of the scraper head (and therefore possibly also a reduction in the required processing time) it is advantageous that the scraper head is provided with at least two recesses.

In yet another preferred variant the scraper head also comprises a top segment which connects to the elongate scraping body and which forms the free end surface of the scraper head. The scraper head provided with such a top segment generally operates better when provided with such a top segment. The top segment can be assembled with the scraping body as (optionally releasable) separate component, although it is also possible to embody the top segment as an integral part of the scraping body.

The elongate scraping body can take a cylindrical form (or tubular if provided with a central opening), although it is also possible to apply an elongate scraping body which takes another form in cross-section, such as for instance, though non-limitatively: an octahedron, an ellipse or a conical form.

In yet another embodiment variant the elongate scraping body is provided with a central passage opening. A central passage opening is understood to mean a recess situated more or less centrally in the elongate scraping body, such as for instance a bore. The recess can be arranged centrally (or even axially) in the scraping body and desirably (though not necessarily) takes a circle-symmetrical form. Not only can the scraper head hereby be given a lighter form, this also makes it possible to realize an external connection to the at least one recess which connects to the central passage opening. Such a connection makes it possible to suction out material (gas, liquid or even detached carcass parts) while it conversely also becomes possible to feed material (gases and/or liquids) to the head. The options for use of the scraper head are thus further increased, whereby its efficiency can increase and/or additional operations can be performed on the carcasses (envisage for instance cleaning here).

It is possible to opt to embody the scraper head such that all the scraping edges bounding the recesses wholly or partially coincide with the periphery of the jacket. Alternatively, it is however also possible for the scraping edges to lie outside the periphery of the jacket in that parts of the jacket located between the recess branches are displaced at least partially to a position outside the jacket. Depending on the conditions of use, it is possible to opt to minimize the danger of damage to the carcass by having the scraping edges coincide wholly or partially with the periphery of the jacket or by enhancing the scraping action by having the scraping edges protrude at least partially outside the periphery of the jacket. It is otherwise noted here that one or more (sharper) scraping edges may also lie within the periphery of the jacket.

It is also advantageous if the maximum cross-section through the elongate scraping body perpendicularly of the length of the scraping body (the longitudinal axis, which in the case of a cylindrical scraping body means the diameter of the cylinder jacket) lies in the range of [20-30] mm. Using such a scraper head the tissue parts for removal can be detached in efficient manner with little unnecessary and undesirable damage to carcass parts not to be removed, such as neck skin and support membranes. The removal of precisely those parts which must be removed (windpipe, gullet and crop), and no more than these parts, has a number of advantages. Firstly, the yield of the slaughtering process can be increased by applying the present scraper head, and the slaughtering product is not contaminated with (portions of) tissue parts which should preferably have been removed. An additional advantage is that, due to the targeted removal of precisely those specific tissue parts to be removed, no unnecessary contamination of the processed carcass occurs (envisage for instance released bone particles)

The diameter of the scraper head is advantageously (considerably) larger than the internal space in the neck of chickens and turkeys. The result hereof is that the neck skin stretches when the scraper head enters the neck, and the neck engages with bias round the scraper head. The neck skin is thus tensioned over the at least one recess in the jacket such that parts of the neck skin fall within the basic shape of the jacket of the scraper head. These parts can be suctioned even further inward by a vacuum to be generated in the scraper head, as a result of which they will be engaged by the scraping edges during rotation of the scraper head. The result hereof is that the tissue parts lying inside the basic shape or radius of the jacket are grasped and pulled away from the neck skin and the membranes forming part of the neck. The jacket herein forms a support surface which is sufficiently large to prevent unnecessary damage to tissues.

The scraper head can advantageously be manufactured from stainless steel and, if it is a scraper head with central passage, the wall thickness of the jacket desirably lies between 2 and 2.5 mm. It has been found in practice that for an optimal operation the scraper head has a total length of at least 100 mm.

In an advantageous embodiment variant the central passage opening of the jacket is also cylindrical. Such an opening is relatively easy to clean and will contribute toward a uniform distribution of underpressure possibly present in the central passage opening. In order to be able to employ underpressure which may be present in the central passage opening for the purpose of suctioning tissue parts for removal into the recess, it is desirable that the recesses in the jacket are made in the jacket such that they connect to the central passage opening.

The orientation of the scraping edges relative to the jacket can be optimized according to the situation. In the case of a cylindrical jacket at least part of the scraping edges can thus run radially relative to the jacket. A more aggressive scraping process can be obtained by having the scraping edges enclose an angle with the radials (in the case of a cylindrical scraping body) of the jacket. Such an angle of the scraping edges is preferably an acute angle which is directed toward the interior of the jacket; i.e. said scraping edges are chamfered toward the interior of the jacket. Advantageous test results have been realized with scraping edges enclosing an acute angle with the jacket of 0°-30°, more preferably 0°-20°. In the case of a scraping body in the form of a cylinder jacket this angle is enclosed with radials of the cylinder jacket. Such edges can be accurately manufactured by for instance a laser processing.

Yet another advantageous embodiment of the scraper head is characterized in that the at least one main recess part is recessed substantially helically in the jacket. Such a helical main recess part can also be referred to as "spiral" or "helix". For application in chicken carcasses 1-5 helical main recess parts are preferably arranged in a scraper head, while 6 or 7 main recess parts are arranged for turkeys. More recesses result in a reduction of the tension on the tissue to be removed. The width of a helical main recess part with which advantageous results are achieved is 9-14 mm, although a width can be chosen which is up to 5 mm smaller when a vacuum is applied. Such a width is necessary to allow the tissue for removal to enter the at least one recess of the scraper head. The angle relative to the longitudinal direction of the scraping body (in the case of a cylinder shape the axial) at which the at least one helical main recess part is arranged in the jacket desirably varies between 20 and 60°.

The recess branches are preferably also recessed substantially helically in the jacket. These smaller helical recess branches preferably have a minimum length of 6 mm and a maximum length of 12 mm because there must be sufficient length to allow the tissue to be clamped in the recess branches. This further enhances release of the tissue parts as a result of rotation and/or removal of the scraper head. The angle relative to the longitudinal direction of the scraping body (in the case of a cylindrical scraping body the axial) at which the helical recess branches are arranged in the jacket desirably varies between 40 and 50'; this angle is preferably about 45°. It is further desirable here that the pitch of the helical recess branches is opposite to the pitch of the associated main recess part. That is, when a main recess part for instance rotates to the left, the helical recess branches connecting thereto rotate to the right, and vice versa. The greater the pitch of the helix, the lower the tension on the tissue to be removed.

The top segment connecting to the free end surface of the scraping body can be embodied as sealing top segment which is provided with a substantially conical object on the side facing toward the central passage opening (the inner side). The sealing top segment prevents unnecessary loss of underpressure on the free end surface (i.e. the front side). The presence of the conical object further ensures that the underpressure possibly present in the central passage opening is distributed in more or less uniform measure over the recesses. The underpressure is thus utilized more advantageously than when such a conical object in combination with a closed top segment is not present.

As alternative, it is also possible that the top segment connecting to the free end surface of the scraping body is open. This increases the accessibility of the central passage, which can be desirable for cleaning reasons, among others. A separate (for instance round) opening can also be arranged in the cylinder wall, whereby the interior of the scraper head can be easily flushed (clean).

Another favourable measure is that the top segment connecting to the free end surface of the elongate scraping body is chamfered on the outer side of the scraper head. The scraper head is hereby self-locating and the chance of unnecessary damage to bones or tissues which do not have to be removed is further reduced.

In order to apply underpressure in the central passage opening of the scraper head and/or pump liquid into the scraper head in simple manner, it is advantageous if the coupling segment is provided with a passage connecting to the central passage opening. The coupling segment can for instance be provided with screw thread, a snap connection, a rapid-action coupling, a bayonet fitting or other (releasable) coupling system of choice.

The invention further provides a device for cleaning the neck of poultry carcasses, provided with a scraper head as described, wherein the device also comprises: counter-coupling means for releasable engagement on the coupling segment of the scraper head; and at least one drive for at least axial and rotating displacement of the counter-coupling means. The device is preferably also provided with underpressure means connecting to the counter-coupling means for generating an underpressure in the central passage opening of the scraper head. For automatic operation thereof the device can be provided with a pressure sensor for the underpressure and/or with at least one pressure sensor for exerted forces. The treatment process can thus be automated in combination with an intelligent control for the drive and/or the underpressure means. In yet another embodiment variant the device is provided with a liquid feed connecting to the counter-coupling means for carrying liquid (such as water) into the scraper head.

The invention also provides a method for cleaning the neck of poultry carcasses, comprising the processing steps of: A) moving a substantially cylindrical scraper head as described above out of the chest cavity into the neck; B) rotating the scraper head in the neck; and C) moving the scraper head out of the carcass, wherein tissue parts protruding into the recess branches in the jacket during processing step B) are urged toward tapering recess branches as a result of the rotation of the scraper head such that at least a part of the tissue parts is clamped in the recess branches. During processing step A) the scraper head will find a path in self-locating manner along the inner side of the breastbone, the wishbone and the collarbones to a position along the dorsal vertebrae and neck vertebrae As described in the foregoing, it is of further advantage here to generate an underpressure in the scraper head such that tissue parts are suctioned into the recess connecting for this purpose to the underpressure. These tissue parts can then be at least partially detached from the neck during processing step B) as a result of the rotation of the scraper head. It is however also possible for tissue parts for removal to be at least partially (further) detached from the neck during processing step C) as a result of the removal of the scraper head from the neck. For the advantages of this method according to the invention reference is made to the already stated advantages in respect of the scraper head.

In an embodiment variant of this method the scraper head can be moved through the neck and out of the carcass after processing step B). This provides the assurance that the neck has been processed over its full length. It also becomes possible here to mechanically clean the scraper head moved through the neck and out of the carcass, for instance by means of an optionally moving brush in combination with a flushing liquid. The scraper head moved through the neck and out of the carcass must then be carried back through the carcass in order to thus move the device clear of the carcass again. This "return stroke" of the scraper head can also produce a further cleaning effect. After processing step B) a liquid can advantageously also be supplied to the scraper head. That is, a flushing liquid can flow through the scraper head both when the scraper head protrudes outward through the neck and/or during the return stroke through the carcass, as a result of which not only cleaning of the scraper head and the neck can be realized, but the chance of damage to the neck during the return stroke of the scraper head can also be reduced.

BRIEF DESCRIPTION OF THE DRAWINGS

The present invention will be further elucidated on the basis of the non-limiting exemplary embodiments shown in the following figures. Herein.

DETAILED DESCRIPTION OF THE PREFERRED EMBODIMENTS

Figure 1:
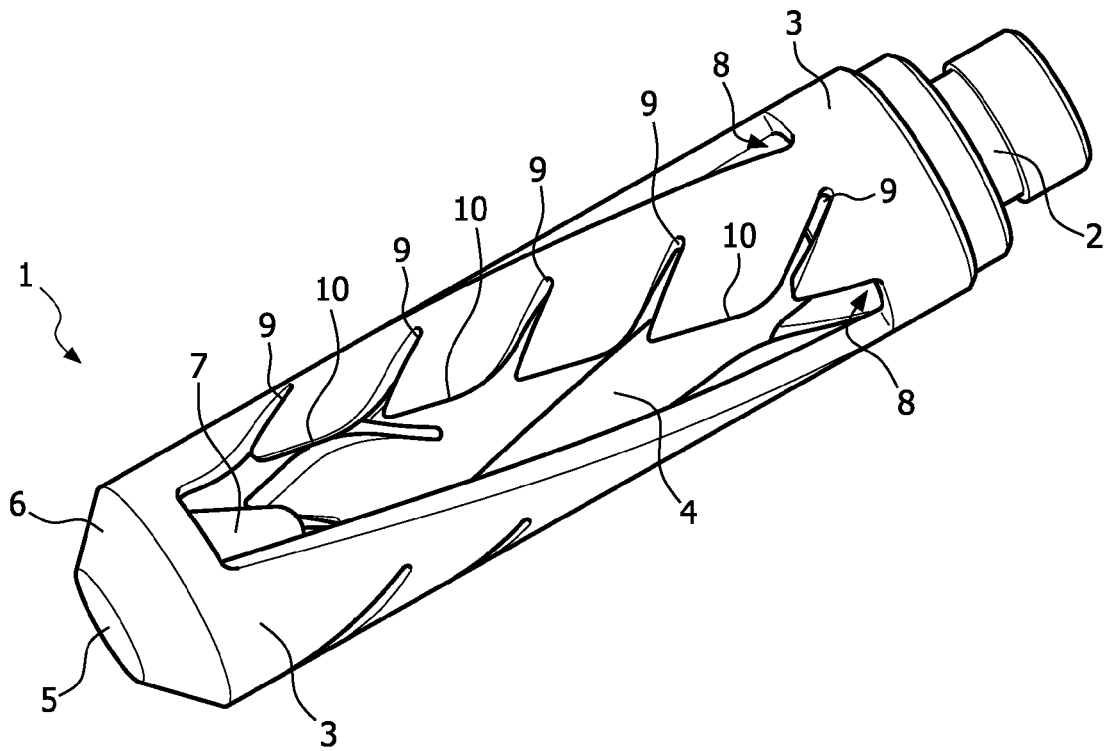
FIG. 1 shows a perspective view of a scraper head according to the present invention.

FIG. 1 shows a scraper head 1 which can be attached using a coupling segment 2 to a device for driving scraper head 1 (not shown in this figure). Scraper head 1 is provided with a scraping body 3 in the form of a cylinder jacket with a central recess 4. This central recess 4 connects to a passage (not visible here) in coupling segment 2 so that an underpressure can be readily generated in central recess 4. The closed end surface 5 remote from coupling segment 2 is provided with a chamfering 6 to enable easy positioning of scraper head 1 in the neck of a carcass. On the inner side of scraper head 1 the closed end surface 5 is provided with a cone body 7 whereby one of the effects is that underpressure prevailing in central recess 4 is distributed.

In the jacket of scraping body 3 larger helical main recesses 8 (spiral-shaped openings) are arranged on each main recess 8, to which connect five recess branches 9 parallel to each other. Tooth-shaped jacket parts with which the desired scraping action is realized thus remain between recess branches 9. Recess branches 9 are also helical, although they have an direction of rotation opposite to that of main recesses 8.

Tissue parts to be removed will protrude through helical main recesses 8 into scraper head 1. By then rotating scraper head 1 these tissues are forced out of helical main recesses 8 into recess branches 9, as a result of which they become clamped in recess branches 9. This can only be realized in one direction of rotation. Main recesses 8 with recess branches 9 are partially bounded by chamfered scraping edges 10, whereby the tissues are scraped loose or possibly even also partially cut loose. Scraping edges 10 are chamfered toward the inner side of cylinder jacket 3 such that they enclose an acute angle with the radials of cylinder jacket 3.

Figure 2:
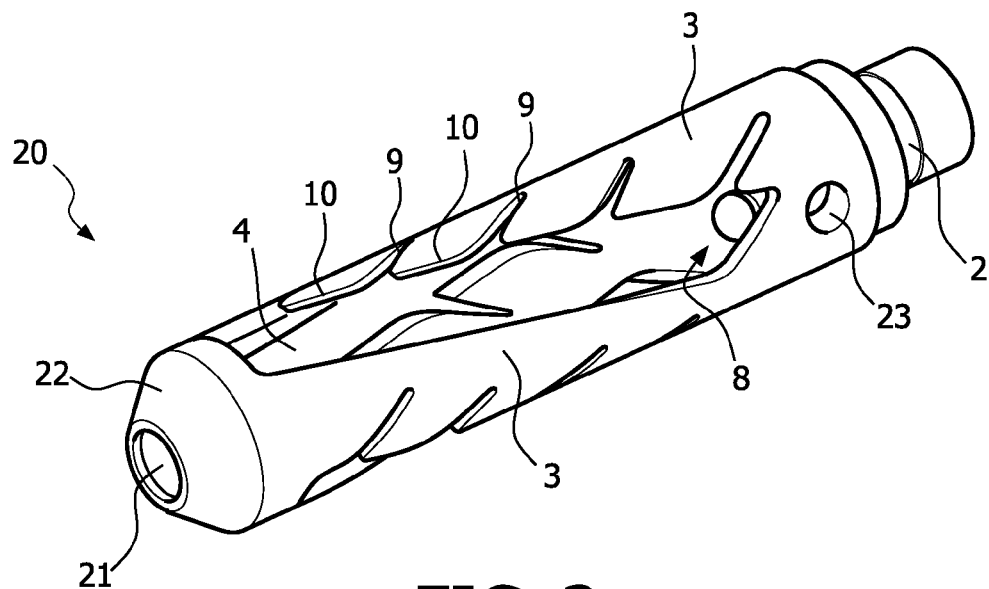
FIG. 2 shows a perspective view of an alternative embodiment variant of a scraper head according to the present invention.

FIG. 2 shows an alternative embodiment variant of a scraper head 20, wherein the components corresponding with the scraper head 1 shown in FIG. 1 are designated with the same reference numerals. At variance with scraper head 1 described above, scraper head 20 is provided with an opened end surface 21 remote from coupling segment 2 which is surrounded by a chamfering 22. Further arranged in cylinder jacket 3 is an additional flushing opening 23 with which central recess 4 can be cleaned after use.

Figures 3A, 3B:
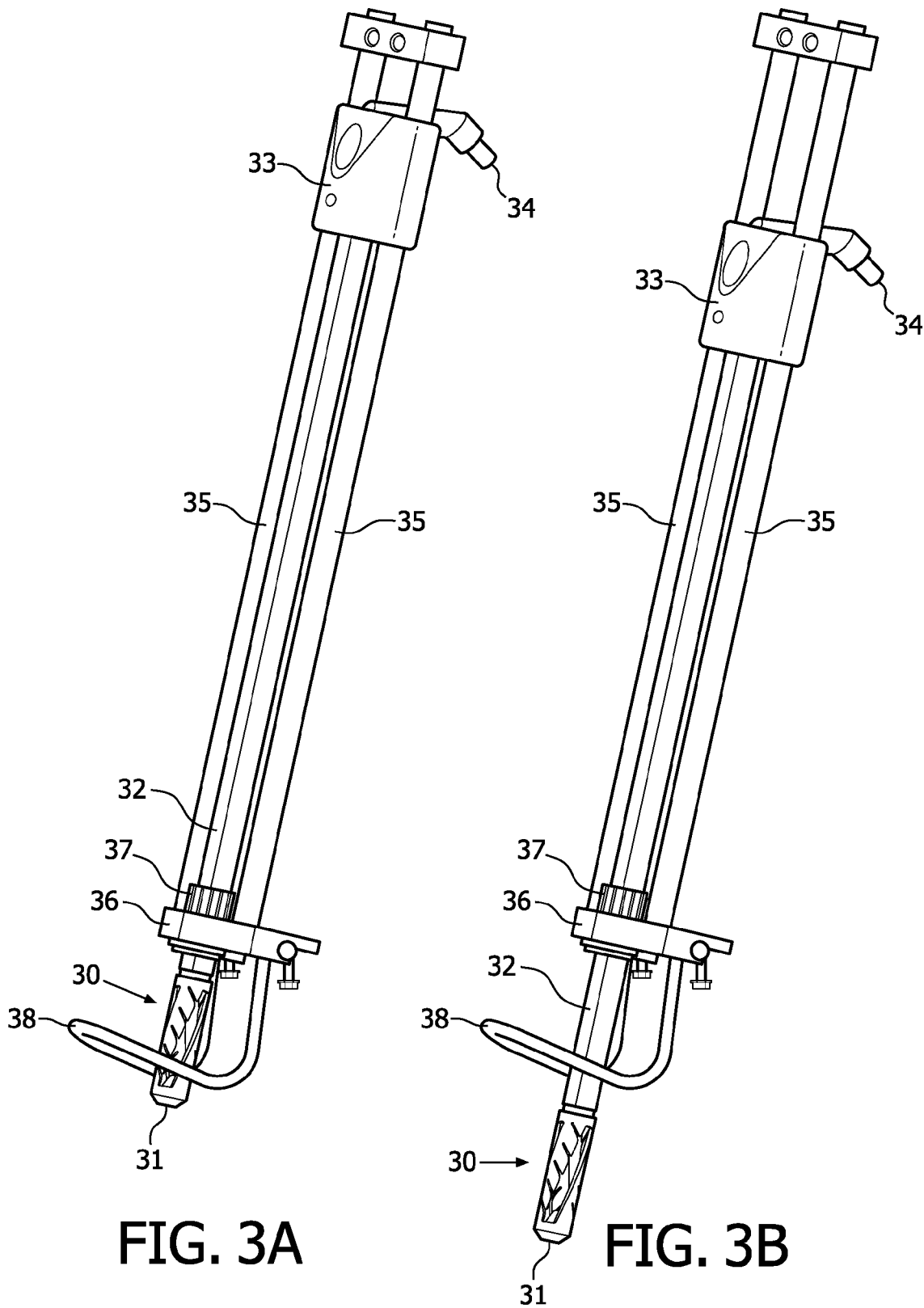
FIGS. 3A and 3B show perspective views of two positions of a device for cleaning the neck of poultry carcasses, provided with a scraper head according to the present invention.

FIGS. 3A and 3B show perspective views of two positions of a part of a device for cleaning the neck of poultry carcasses according to the present invention. FIG. 3A shows a scraper head 30 with a free end surface 31. On the side opposite the free end surface 31 is situated a coupling segment of scraper head 30, which is not visible in this figure since it is engaged by a coupling rod 32 in which a central passage is left clear.

On the side remote from scraper head 30 coupling rod 32 connects to a guide element 33 which is also provided with a connection 34 for generating underpressure in coupling rod 32, and optionally also for feeding a flushing liquid such as water to coupling rod 32. The underpressure prevailing in coupling rod 32 will be transmitted to scraper head 30, and the flushing liquid optionally fed to coupling rod 32 will also be fed through to scraper head 30.

Guide element 33 engages slidably on two guide rods 35 such that coupling rod 32 and the scraper head 30 attached thereto are displaceable parallel to guide rods 35. See also FIG. 3B here for, in which the identical components are shown in a situation in which scraper head 30 is displaced further downward than in FIG. 3A. A bridging piece 36 with a passage for coupling rod 32 is also accommodated between guide rods 35. Connecting to this bridging piece 36 is situated a toothed wheel 37, likewise having a passage for coupling rod 32. The passage in toothed wheel 37 has a cross-section which connects to coupling rod 32 such that, when toothed wheel 37 is rotated, the coupling rod also begins to rotate. Toothed wheel 37 can thus be set into rotation with a drive (not shown in this figure), as a result of which coupling rod 32, and so scraper head 30 as well, are rotated.

In the situation shown in this FIG. 3A scraper head 30 is guarded by a bracket 38 and scraper head 30 will thus be in a non-active mode, while in the situation shown in FIG. 3B scraper head 30 could be situated in a poultry carcass.

Figure 4A:
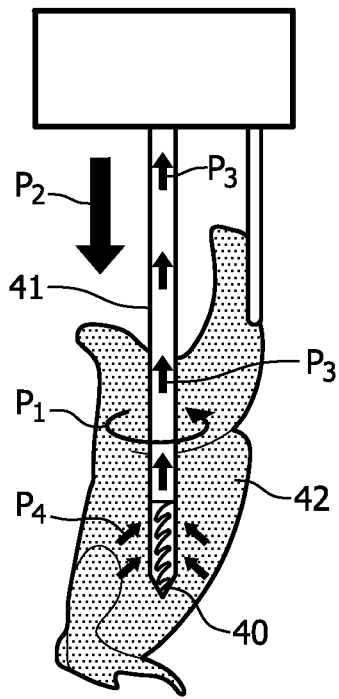
FIGS. 4A-4E show schematically processing steps of the method according to the present invention.

FIGS. 4A-4E show a number of successive processing steps of the method according to the present invention. In FIG. 4A a scraper head 40 is moved downward (see arrow P2) rotatingly (see arrow P1) by a coupling rod 41 out of the chest cavity into the neck of a poultry carcass 42. Coupling rod 41 meanwhile generates an underpressure (see arrows P3) in scraper head 40, whereby tissue parts (in particular the trachea and crop) are suctioned inside the outer diameter of scraper head 40 (see arrow P4), and are detached.

Figure 4B:
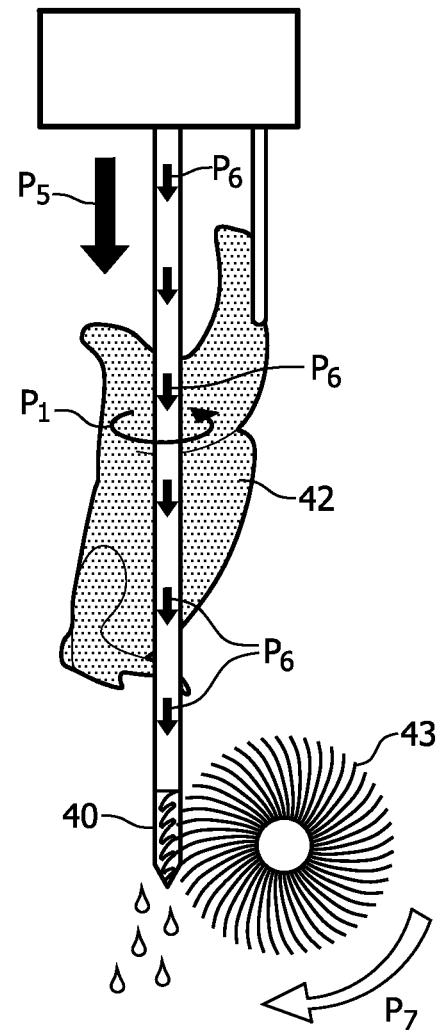

In FIG. 4B scraper head 40 is forced out of carcass 42 through the neck (see arrow P5). Water is now flushed through coupling rod 41 (see arrows P6), whereby scraper head 40 is flushed clean. Scraper head 40 is meanwhile still rotating (arrow P1). Outside carcass 42 a rotating brush 43 engages on scraper head 40 (see arrow P7) for mechanical cleaning thereof. Additional cleaning liquid can optionally also be supplied.

Figure 4C:
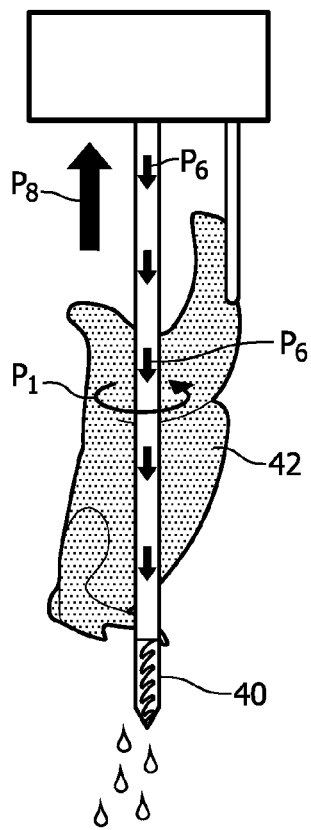
Figure 4D:
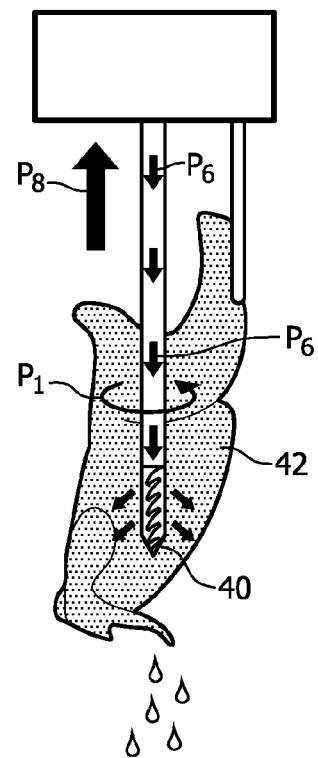
Figure 4E:
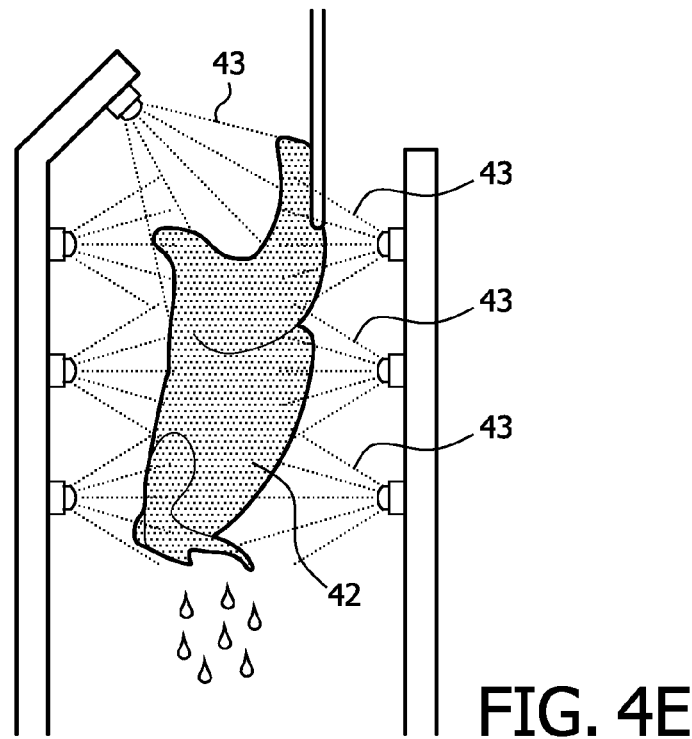

In FIG. 4C scraper head 40 is moved upward again (see arrow P8) relative to the previous figure. Because liquid is still being carried through coupling rod 41 to the scraper head, it will be easier to retract scraper head 40 through the neck during this return stroke, with less chance of unnecessary damage to the neck. The movement of FIG. 4C is continued during the situation as shown in FIG. 4D; scraper head 40 is again situated here wholly inside carcass 42. The flushing liquid flowing out of scraper head 40 (see arrows P9) reduces the chance of damage but flushes the neck in that it is "inflated" away from scraper head 40. The chance is further reduced of loose tissue parts remaining in the neck. FIG. 4E shows that, as it leaves the machine, carcass 42 is cleaned on the outside by powerful liquid jets (water jets) 43.

The invention claimed is:

1. A scraper head for cleaning the neck of poultry carcasses, comprising:
   an elongate scraping body with a jacket, which is provided with at least one recess left clear in the jacket, wherein the at least one recess is an opening defined in and extending through the jacket, and wherein at least part of the edges bounding the recess form scraping edges for detaching from the carcass the tissue parts to be removed from the neck of poultry carcasses; and
   a coupling segment connecting to an end surface of the elongate scraping body opposite a free end surface,
   wherein the recess left clear in the jacket is provided with an elongate main recess part to which at least two recess branches connect, and
   wherein the elongate main recess part is oriented helically in the jacket.

2. The scraper head as claimed in claim 1, wherein a transition from the elongate main recess part to the recess branch and facing the coupling segment is provided with a rounded corner with a radius greater than 0 and less than or equal to 3 mm.

3. The scraper head as claimed in claim 1, wherein the scraper head also comprises a top segment which connects to the elongate scraping body and which forms the free end surface of the scraper head.

4. The scraper head as claimed in claim 1, wherein the scraping edges wholly or partially coincide with the periphery of the jacket.

5. The scraper head as claimed in claim 1, wherein the scraping edges lie outside the periphery of the jacket in that parts of the jacket located between the recess branches are displaced at least partially to a position outside the jacket.

6. The scraper head as claimed in claim 1, wherein the scraping edges enclose an angle with radials of the jacket.

7. The scraper head as claimed in claim 6, wherein the angle the scraping edges enclose with radials of the jacket is an acute angle which is directed toward the interior of the jacket.

8. The scraper head as claimed in claim 6, wherein the angle the scraping edges enclose with radials of the jacket is 0° to 30°.

9. The scraper head as claimed in claim 1, wherein the recess branches are recessed substantially helically in the jacket.

10. The scraper head as claimed in claim 3, wherein the top segment connecting to the free end surface of the elongate scraping body is a sealing top segment which is provided with a substantially conical object on the side facing toward a central passage opening.

11. The scraper head as claimed in claim 3, wherein the top segment connecting to the free end surface of the elongate scraping body is an opened top segment.

12. A device head for cleaning the neck of poultry carcasses, provided with a scraper head as claimed in claim 1, wherein the device also comprises:
   counter-coupling means for releasable engagement on the coupling segment of the scraper head; and
   at least one drive for at least axial and rotating displacement of the counter-coupling means.

13. The device as claimed in claim 12, wherein the device is provided with feed means for liquid connecting to the counter-coupling means.

14. The device as claimed in claim 12, wherein the device is provided with a pressure sensor for detecting an underpressure generated by an underpressure means.

15. The device as claimed in claim 14, wherein the device is provided with at least one pressure sensor for detecting the forces exerted with a scraper head.

16. The device as claimed in claim 14, wherein the device is provided with an intelligent control for the drive and/or the underpressure means communicating with at least one sensor.

17. A method for cleaning the neck of poultry carcasses, comprising the processing steps of:

A) moving a scraper head as claimed in claim 1 out of the chest cavity into the neck;
B) rotating the scraper head in the neck; and
C) moving the scraper head out of the carcass,
wherein tissue parts protruding into recess branches during processing step B) are urged toward tapering recess branches as a result of the rotation of the scraper head such that at least a part of the tissue parts is clamped in the recess branches.

18. The method of claim 17, wherein the method also comprises of generating an underpressure in the scraper head such that tissue parts are suctioned into the recess connecting for this purpose to the underpressure.

19. The method of claim 17, further comprising the step of supplying water to the scraper head.

\* \* \* \* \*